US012614797B2

(12) United States Patent
Zhao et al.

(10) Patent No.: US 12,614,797 B2
(45) Date of Patent: Apr. 28, 2026

(54) END PLATE, CASE, BATTERY, ELECTRIC DEVICE, AND ASSEMBLING METHOD FOR CASE

(71) Applicant: CONTEMPORARY AMPEREX TECHNOLOGY CO., LIMITED, Ningde (CN)

(72) Inventors: Pengbo Zhao, Ningde (CN); Yong Wang, Ningde (CN); Wei Zhang, Ningde (CN); Li Fu, Ningde (CN); Qing Wang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/313,125

(22) Filed: Aug. 28, 2025

(65) Prior Publication Data

US 2025/0391977 A1 Dec. 25, 2025

Related U.S. Application Data

(63) Continuation of application No. PCT/CN2023/115805, filed on Aug. 30, 2023.

(51) Int. Cl.
*H01M 50/204* (2021.01)
*H01M 10/6556* (2014.01)
*H01M 50/244* (2021.01)

(52) U.S. Cl.
CPC ..... *H01M 50/204* (2021.01); *H01M 10/6556* (2015.04); *H01M 50/244* (2021.01)

(58) Field of Classification Search
None
See application file for complete search history.

(56) References Cited

U.S. PATENT DOCUMENTS

2020/0091745 A1* 3/2020 Yang .......................... H02J 7/70
2021/0135323 A1* 5/2021 Zhang ................. H01M 50/507
(Continued)

FOREIGN PATENT DOCUMENTS

CN      209344191 U      9/2019
CN      111293253 A      6/2020
(Continued)

OTHER PUBLICATIONS

The World Intellectual Property Organization (WIPO) International Search Report for and Written Opinion for PCT/CN2023/115805 Nov. 22, 2023 18 pages (including English translation).
(Continued)

*Primary Examiner* — Scott J. Chmielecki
(74) *Attorney, Agent, or Firm* — ANOVA LAW GROUP, PLLC

(57) ABSTRACT

An end plate comprises: a first plate, comprising a first connecting part, wherein the first connecting part is arranged in a closed ring along the circumferential edge of the first plate and is configured to form continuous sealing connection with an environment component; and a second plate, stacked with the first plate in a first direction, wherein the second plate comprises second connecting parts spaced along the circumferential edge of the second plate. The first connecting part of the first plate is in continuous sealing connection with the environment component and is used for sealing the position where the end plate and the environment component are connected, and the second connecting parts of the second plate are connected to the environment component respectively by means of connecting members and is used for improving the strength of connection between the end plate and the environment component.

19 Claims, 21 Drawing Sheets

(56)  References Cited

U.S. PATENT DOCUMENTS

| | | | | |
|---|---|---|---|---|
| 2021/0391618 A1* | 12/2021 | Wang | .................. | H01M 10/613 |
| 2023/0327269 A1* | 10/2023 | Yu | ...................... | H01M 50/242 |
| | | | | 429/99 |
| 2024/0204298 A1* | 6/2024 | He | ...................... | H01M 50/209 |
| 2024/0297389 A1* | 9/2024 | Zhang | ..................... | B60K 1/04 |

FOREIGN PATENT DOCUMENTS

| | | | |
|---|---|---|---|
| CN | 216015589 U | 3/2022 |
| CN | 216354489 U | 4/2022 |
| CN | 217426978 U | 9/2022 |
| CN | 217768563 U | 11/2022 |
| CN | 218070063 U | 12/2022 |
| CN | 218351622 U | 1/2023 |
| CN | 221009093 U | 5/2024 |
| KR | 20170065832 A | 6/2017 |
| WO | 2023142973 A1 | 8/2023 |

OTHER PUBLICATIONS

The First Office Action of the Chinese application No. 202380010536.9, issued on Dec. 29, 2025.

* cited by examiner

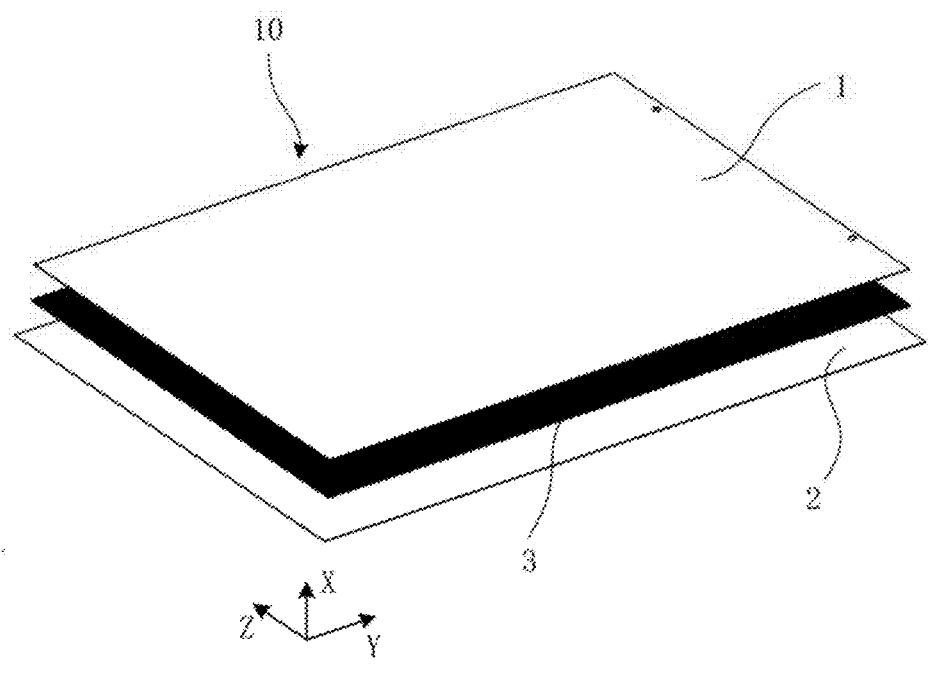
FIG. 3
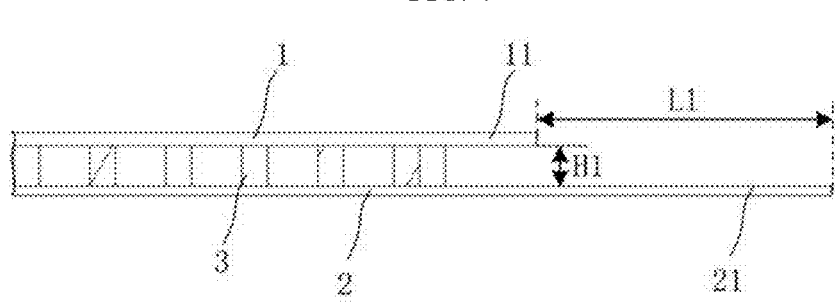
FIG. 4
FIG. 5

END PLATE, CASE, BATTERY, ELECTRIC DEVICE, AND ASSEMBLING METHOD FOR CASE

CROSS-REFERENCE TO RELATED APPLICATION

This application is a continuation of International Application No. PCT/CN2023/115805, filed on Aug. 30, 2023, the entire content of which is incorporated herein by reference.

TECHNICAL FIELD

The present application relates to the technical field of batteries, and in particular, to an end plate, a case, a battery, an electric device, and an assembling method for the case.

BACKGROUND

In some related technologies, a battery includes a case and a battery cell. The battery cell was placed inside the case. The end plate of the case has issues such as numerous components and parts and a complex structure.

SUMMARY

Some embodiments of the present application provide an end plate, a case, a battery, an electric device, and an assembling method for the case to alleviate the problem of complex end plate structure.

Some embodiments of the present application further provide an end plate. The end plate includes: a first plate including a first connecting part, where the first connecting part is arranged as a closed loop along a circumferential edge of the first plate and configured to form a continuously sealed connection with an environmental component; and a second plate disposed in a stacked manner with the first plate in a first direction, where the second plate includes second connecting parts spaced apart from each other along a circumferential edge of the second plate, and the second connecting parts are configured to be connected to the environmental component via a connecting member.

In the above embodiment, the end plate includes the first plate and the second plate disposed in a stacked manner. The first connecting part of the first plate forms a continuously sealed connection with the environmental component to achieve sealing at the joint between the end plate and the environmental component. The second connecting parts of the second plate are connected to the environmental component via the connecting member to improve the connection strength between the end plate and the environmental component. The end plate has a simple structure with fewer components, and the connection of the end plate to the environmental component is easy to operate, cost-effective, and highly reliable.

In some embodiments, the first connecting part and the second connecting parts are not in the same plane.

In the above embodiment, since the first connecting part and the second connecting parts are not in the same plane, when one of the first connecting part and the second connecting parts is connected, the other of the first connecting part and the second connecting parts is not affected.

In some embodiments, the end plate further includes an intermediate member disposed between the first plate and the second plate, where the intermediate member connects the first plate and the second plate and allows the first plate to be separated from the second plate.

In the above embodiment, the intermediate member is disposed between the first plate and the second plate, and the intermediate member allows the first plate to be separated from the second plate, such that a buffering effect can be provided for the end plate and the impact resistance of the end plate can be improved.

In some embodiments, the intermediate member is configured as a honeycomb structure.

In the above embodiment, the intermediate member of a honeycomb structure is disposed between the first plate and the second plate, such that a buffering effect can be provided for the end plate and the impact resistance of the end plate can be improved.

In some embodiments, the intermediate member forms at least one flow channel between the first plate and the second plate, and an extension direction of the flow channel intersects with the first direction.

In the above embodiment, the intermediate member forms at least one flow channel between the first plate and the second plate, such that coolant liquid can be conveyed through the flow channel to reduce the temperature of the end plate and other components that abut against the end plate, and a buffering effect can be provided by the intermediate member to improve the impact resistance of the end plate.

In some embodiments, the intermediate member includes a first component and a second component, the first component is configured as a honeycomb structure, the second component forms at least one flow channel between the first component and the first plate or the second plate, and an extension direction of the flow channel intersects with the first direction.

In the above embodiment, the intermediate member includes the first component and the second component. The first component is configured as a honeycomb structure, such that a buffering effect can be provided and the impact resistance of the end plate can be improved. The second component forms at least one flow channel between the first plate and the second plate, such that coolant liquid can be conveyed through the flow channel to reduce the temperature of the end plate and other components that abut against the end plate, and a buffering effect can be provided by the second component to improve the impact resistance of the end plate.

In some embodiments, the projection range of the second connecting parts in the first direction covers and extends beyond the projection range of the first connecting part in the first direction.

In the above embodiment, the circumferential edge of the second plate extends beyond the circumferential edge of the first plate to achieve a continuously sealed connection between the first connecting part at the circumferential edge of the first plate and the environmental component and the connection of at least two connecting members spaced apart from each other at the circumferential edge of the second plate to the environmental component.

In some embodiments, the projection range of the first connecting part in the first direction covers and extends beyond the projection range of the intermediate member in the first direction.

In the above embodiment, the circumferential edge of the first plate extends beyond the circumferential edge of the intermediate member to achieve the following: assembling the first plate, the intermediate member, and the second plate first, then inserting the extending part of the environmental component into the area between the first plate and the second plate, and achieving a continuously sealed connection between the first plate and the environmental component at a side of the first plate facing away from the second plate.

In some embodiments, the projection range of the intermediate member in the first direction covers and extends beyond the projection range of the first connecting part in the first direction.

In the above embodiment, the circumferential edge of the intermediate member extends beyond the circumferential edge of the first plate to achieve a continuously sealed connection between the first plate and the environmental component at a side of the first plate close to the second plate first and then the assembling of the intermediate member and the second plate.

Some embodiments of the present application further provide a case. The case includes the end plate in any one of the above embodiments, and a frame, which is the environmental component.

In the above embodiment, the case includes the end plate in any one of the above embodiments and correspondingly has the beneficial effects of the end plate.

In some embodiments, the first connecting part is closer to the internal space of the case than the second connecting part.

In the above embodiment, since the first connecting part is closer to the internal space of the case than the second connecting part, when one of the first connecting part and the second connecting part is connected, the other of the first connecting part and the second connecting part is not affected.

In some embodiments, the first connecting part forms a continuously sealed connection with the frame by friction stir welding.

In the above embodiment, the first connecting part is connected to the frame by friction stir welding, which offers operational convenience, facilitates mechanization and automation, and requires simple equipment at low cost.

In some embodiments, the case further includes a connecting member, and the connecting member includes a flow drill screw (FDS).

In the above embodiment, the second connecting part is connected to the frame via flow drill screws, and no prepunching is required. This is easy to operate and requires low costs.

In some embodiments, the projection range of the second connecting parts in the first direction covers and extends beyond the projection range of the first connecting part in the first direction; the frame is disposed at a side of the second plate adjacent to the first plate, and the frame is disposed around a circumferential outer edge of the first plate.

In the above embodiment, the frame is disposed at a side of the second plate adjacent to the first plate, the second plate covers the frame, the frame is disposed around the circumferential outer edge of the first plate, and the projection range of the second connecting parts in the first direction covers and extends beyond the projection range of the first connecting part in the first direction. This is to achieve a continuously sealed connection between the first connecting part at the circumferential edge of the first plate and the frame, so that the frame and the end plate can form a sealed connection to allow the cavity enclosed by the frame to be sealed at the end plate. At least two connecting members spaced apart from each other at the circumferential edge of the second plate are connected to the frame to improve connection strength between the end plate and the frame.

In some embodiments, the projection range of the first connecting part in the first direction covers and extends beyond the projection range of the intermediate member in the first direction. The frame includes a first extending part extending into the area between the first plate and the second plate, and the first extending part forms a continuously sealed connection with the first connecting part.

In the above embodiment, the projection range of the first connecting part in the first direction covers and extends beyond the projection range of the intermediate member in the first direction to achieve the following: assembling the first plate, the intermediate member, and the second plate first, then inserting the first extending part of the frame into the area between the first plate and the second plate, and achieving a continuously sealed connection between the first plate and the frame at a side of the first plate facing away from the second plate. The first extending part is not only configured to connect the frame and the end plate, but also can support the welding of the first plate.

In some embodiments, a side of the first extending part facing away from the second plate forms a continuously sealed connection with the first connecting part.

In the above embodiment, the first extending part of the frame is inserted into the area between the first plate and the second plate, and the side of the first extending part facing away from the second plate abuts against the first connecting part to form a continuously sealed connection, thereby achieving the continuously sealed connection between the first plate and the frame.

In some embodiments, the frame further includes a first limiting part. The first limiting part is disposed at the side of the first extending part facing away from the second plate, and the first limiting part abuts against the circumferential outer edge of the first plate.

In the above embodiment, allowing the first limiting part to abut against the circumferential outer edge of the first plate can position the first plate and is to achieve a continuously sealed connection between the first plate and the first limiting part, as well as the first extending part.

In some embodiments, a side of the first limiting part facing away from the second plate is flush with a side of the first plate facing away from the second plate.

In the above embodiment, allowing the side of the first limiting part facing away from the second plate to be flush with the side of the first plate facing away from the second plate can enable the formation of a flat bottom structure in the case.

In some embodiments, the projection range of the intermediate member in the first direction covers and extends beyond the projection range of the first connecting part in the first direction; the frame includes a second extending part, the second extending part is located at a side of the first plate facing away from the second plate, and the second extending part forms a continuously sealed connection with the first connecting part.

In the above embodiment, the projection range of the intermediate member in the first direction covers and extends beyond the projection range of the first connecting part in the first direction to achieve the following: assembling the intermediate member and the second plate after the formation of a continuously sealed connection between the first plate and the frame at a side of the first plate close to the second plate; and supporting the first plate by the second extending part first, allowing the first connecting part to form a continuously sealed connection with the second extending part of the frame, and then assembling the second plate. The second extending part is not only configured to connect the frame and the end plate, but also configured to support the welding of the first plate.

In some embodiments, a side of the second extending part adjacent to the second plate forms a continuously sealed connection with the first connecting part.

In the above embodiment, the second extending part is located at the side of the first plate facing away from the second plate, and the side of the second extending part adjacent to the second plate abuts against the first connecting part to form a continuously sealed connection with the first connecting part, thereby achieving a continuously sealed connection between the first plate and the frame.

In some embodiments, the frame further includes a second limiting part. The second limiting part is disposed at the side of the second extending part adjacent to the second plate, and the second limiting part abuts against the circumferential outer edge of the first plate.

In the above embodiment, allowing the second limiting part to abut against the circumferential outer edge of the first plate can position the first plate and is to achieve a continuously sealed connection between the first plate and the second limiting part, as well as the second extending part.

In some embodiments, the side of the second limiting part adjacent to the second plate is flush with the side of the first plate adjacent to the second plate.

In the above embodiment, the second limiting part is configured to limit the first plate.

Some embodiments of the present application further provide a battery, which includes the case provided in any one of the above embodiments.

In the above embodiment, the battery includes the case in any one of the above embodiments and correspondingly has the beneficial effects of the case.

Some embodiments of the present application further provide an electric device, which includes the battery provided in any one of the above embodiments.

In the above embodiment, the electric device includes the battery in any one of the above embodiments and correspondingly has the beneficial effects of the battery.

Some embodiments of the present application further provide an assembling method for a case, which includes the following steps: providing a frame; and providing an end plate, where the end plate includes a first plate and a second plate disposed in a stacked manner in a first direction, the first plate includes a first connecting part arranged as a closed loop along a circumferential edge of the first plate, and the second plate includes second connecting parts spaced apart from each other along a circumferential edge of the second plate; and allowing an entire circumferential edge of at least one of the first connecting part and the second connecting parts to be in continuously sealed connection with the frame.

In the above embodiment, allowing the entire circumferential edge of at least one of the first connecting part and the second connecting parts to be in continuously sealed connection with the frame is to achieve sealing at the joint between the end plate and the frame. This mode features simple structure, convenient installation, high assembly efficiency, low costs, and high reliability.

In some embodiments, the first connecting part is closer to the internal space of the case than the second connecting parts; allowing the entire circumferential edge of at least one of the first connecting part and the second connecting parts to be in continuously sealed connection with the frame includes: allowing the entire circumferential edge of the first connecting part to be in continuously sealed connection with the frame, and allowing the circumferential edge of the second connecting parts to be connected to the frame via at least two connecting members.

In the above embodiment, the first connecting part forms a continuously sealed connection with the frame to achieve sealing at the joint between the end plate and the frame. The second connecting parts are connected to the frame via at least two connecting members to improve the connection strength between the end plate and the frame. The end plate has a simple structure with fewer components, and the connection of the end plate to the frame is easy to operate, cost-effective, and highly reliable.

In some embodiments, before allowing both of the circumferential edge of the first connecting part and the circumferential edge of the second connecting parts to be connected to the frame, the assembling method further includes: placing the frame at a side of the second plate adjacent to the first plate, where the frame is disposed around a circumferential outer edge of the first plate, and a first extending part on the frame extends into an area between the first plate and the second plate; allowing the entire circumferential edge of at least one of the first connecting part and the second connecting parts to be in continuously sealed connection with the frame includes: allowing the entire circumferential edge of the first connecting part to form a continuously sealed connection with the frame, and allowing the circumferential edge of the second connecting parts to be connected to the frame via at least two connecting members.

In the above embodiment, the end plate is first manufactured and then is connected to the frame. The connection between the end plate and the frame is divided into an upper portion connection and a lower portion connection. For the upper portion of the end plate, a continuously sealed connection is adopted to connect the first plate and the frame, and for the lower portion of the end plate, the second plate is connected to the frame via the connecting members. This mode in which the upper portion and the lower portion are both connected and fastened features simple structure, convenient installation, high assembly efficiency, low costs, and high reliability.

In some embodiments, providing the frame includes: placing the frame, so that an end part of the frame connected to the end plate is located above a cavity enclosed by the frame; allowing the entire circumferential edge of at least one of the first connecting part and the second connecting parts to be in continuously sealed connection with the frame includes: allowing the first plate to be placed within the end part of the frame and to be supported by a second extending part on the frame; allowing the entire circumferential edge of the first connecting part to form a continuously sealed connection with the second extending part; and disposing the second plate at a side of the first plate facing away from the frame, allowing the second plate to cover the frame, and allowing the second connecting parts to be connected to the frame via at least two connecting members.

In the above embodiment, the first plate of the end plate first forms a continuously sealed connection with the frame, then the second plate is installed, and finally, the second plate is connected to the frame as a whole, thus forming a case structure with fewer components and parts and a simple structure. This mode in which the upper portion and the lower portion are both connected and fastened features simple structure, convenient installation, high assembly efficiency, low costs, and high reliability.

BRIEF DESCRIPTION OF THE DRAWINGS

To more clearly illustrate the technical solutions in the embodiments of the present application, the drawings required for illustrating the embodiments of the present application are briefly described below. Apparently, the drawings in the following description illustrate merely some embodiments of the present application, and those of ordinary skills in the art may still derive other drawings from these drawings without creative efforts.

FIG. 3 is an exploded structural schematic view of an end plate disclosed according to some embodiments of the present application;

FIG. 4 is a cross-sectional view of an end plate disclosed according to a first embodiment of the present application;

FIG. 5 is a partially enlarged schematic view of FIG. 4;

Figure 1:
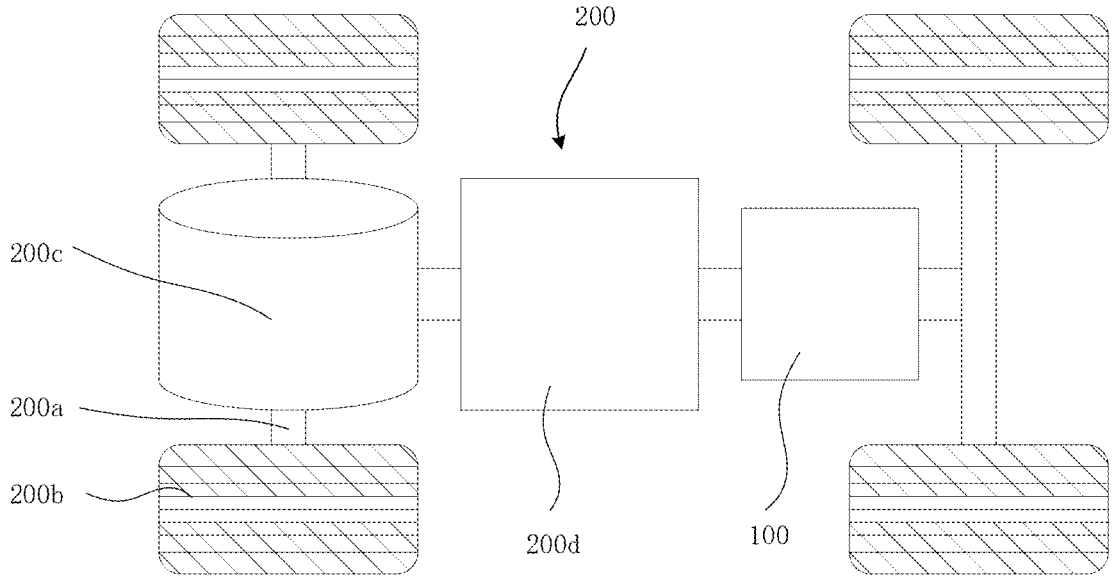
FIG. 1 is a structural schematic view of a vehicle disclosed according to some embodiments of the present application.

The drawings are not necessarily drawn to scale.

DESCRIPTION OF REFERENCE NUMERALS

1—first plate; 11—first connecting part; 2—second plate; 21—second connecting part; 3—intermediate member; 31—first component; 32—second component; 33—first honeycomb structure; 34—second honeycomb structure; 4—flow channel; 10—end plate; 20—frame; 201—first extending part; 202—second extending part; 203—first limiting part; 204—second limiting part; 30—connecting member; 40—weld seam; 100—battery; 101—case assembly; 101a—first case; 101b—second case; 102—battery cell; 200—vehicle; 200a—vehicle axle; 200b—vehicle wheel; 200c—motor; 200d—controller.

DETAILED DESCRIPTION

Implementations of the present application will be described in further detail with reference to the drawings and embodiments. The following detailed description of the embodiments and the drawings are used for the exemplary illustration of the principles of the present application, but are not intended to limit the scope of the present application. That is, the present application is not limited to the described embodiments.

In the description of the present application, it should be noted that, unless otherwise specified, "a plurality" means two or more; the orientations or positional relationships indicated by the terms "upper", "lower", "left", "right", "inner", "outer", and the like are merely for the convenience of describing the present application and simplifying the description, rather than indicating or implying that the apparatus or element referred to must have a specific orientation or be configured and operated in the specific orientation, and thus shall not be construed as limitations to the present application. Furthermore, the terms "first", "second", "third", and the like are used for descriptive purposes only and shall not be construed as indicating or implying relative importance. The "perpendicular" is not strictly perpendicular but is within the allowable range of error. The "parallel" is not strictly parallel but is within the allowable range of error.

The following description is given with the directional terms as illustrated in the drawings and is not intended to limit the specific structure of the present application. In the description of the present application, it should further be noted that unless otherwise explicitly specified or defined, the terms "install", "link", and "connect" shall be construed broadly and may be, for example, fixed connection, detachable connection, or integral connection, or direct connection or indirect connection via an intermediate. For those of ordinary skills in the art, the specific meaning of the above terms in the present application may be interpreted according to the specific condition.

In this disclosure, unless otherwise specified, phrases like "at least one of A, B, and C" and "at least one of A, B, or C" both mean only A, only B, only C, or any combination of A, B, and C.

With the vigorous promotion of new energy vehicles, power batteries, as a type of rechargeable battery, serve as the power source for new energy vehicles and are widely used in the field of new energy vehicles. In some related technologies, a battery includes a case assembly and a battery cell. The case assembly includes a first case and a second case, and the battery cell is accommodated in an enclosed cavity formed after the first case and the second case are snap-fitted together. At least one of the first case and the second case includes an end plate and a frame. To achieve the connection between the end plate and the frame, the end plate includes numerous components and parts, and the connection structure between the end plate and the frame is complex.

Based on this, some embodiments of the present application provide an end plate, a case, a battery, an electric device, and an assembling method for the case to alleviate the problem of complex end plate structure.

The battery of the present application can be used in an electric device and can provide electric energy for the electric device. The electric device may be a mobile phone, a portable device, a notebook computer, an electric bicycle, an electric car, a ship, a spacecraft, an electric toy, an electric tool, or the like. The spacecraft includes an airplane, a rocket, a space shuttle, a space ship, and the like. The electric toy includes a stationary or mobile electric toy, such as a game console, an electric car toy, an electric ship toy, and an electric airplane toy. The electric tool includes a metal cutting electric tool, a grinding electric tool, an assembly electric tool, and a railway electric tool, such as an electric drill, an electric grinder, an electric wrench, an electric screwdriver, an electric hammer, an impact drill, a concrete vibrator, and an electric planer.

Referring to FIG. 1, the electric device of the present application may be a vehicle 200. For example, the new energy vehicle may be a pure electric vehicle, a hybrid vehicle, an extended-range vehicle, or the like.

The vehicle 200 includes a vehicle axle 200a, vehicle wheels 200b, a motor 200c, a controller 200d, and a battery 100. The vehicle wheels 200b are connected to the vehicle axle 200a, the motor 200c is configured to drive the vehicle axle 200a to rotate, the controller 200d is configured to control the motor 200c to work, and the battery 100 may be disposed at the bottom, the head, or the tail of the vehicle 200 and is configured to provide electric energy for the operations of the motor 200c and other components in the vehicle.

Figure 2:
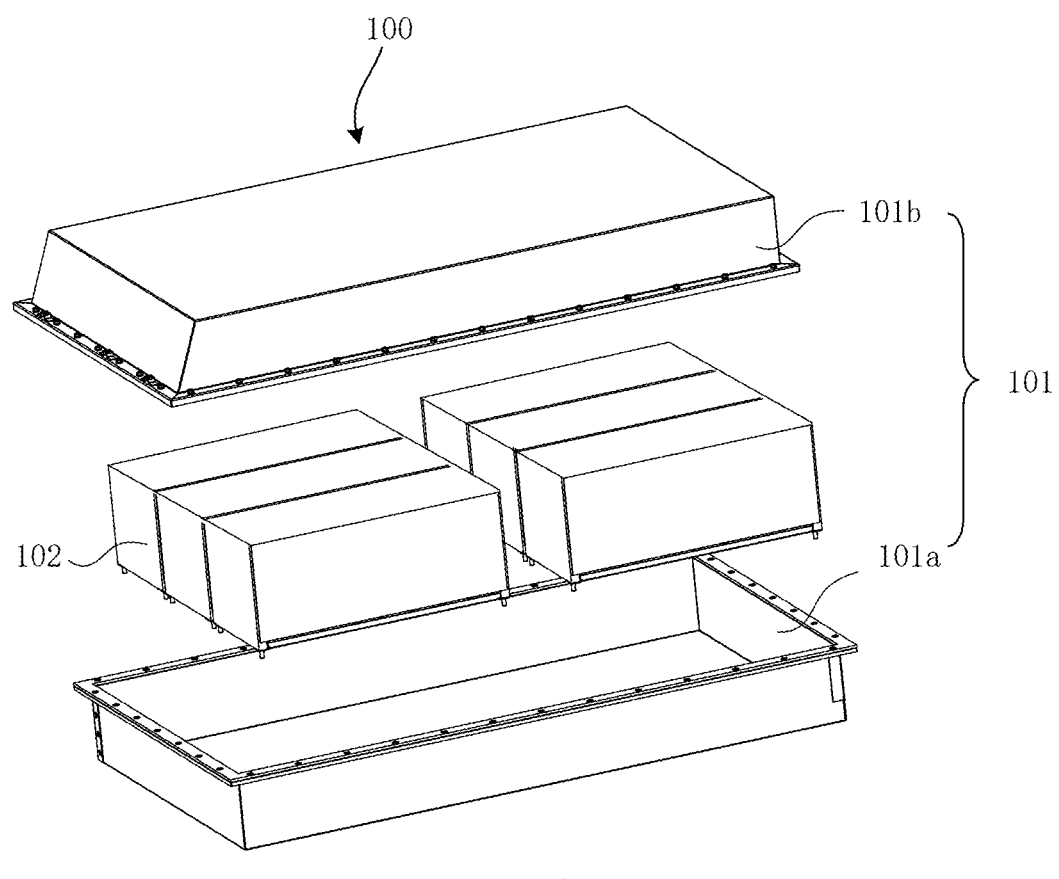
FIG. 2 is an exploded structural schematic view of a battery disclosed according to some embodiments of the present application.

Referring to FIG. 2, the battery 100 includes a case assembly 101 and at least one battery cell 102. The at least one battery cell 102 includes a plurality of (two or more) battery cells 102. The plurality of battery cells 102 may be connected in series or in parallel or in series-parallel, where the series-parallel connection refers to the mixture of the serial connection and the parallel connection. The inside of the case assembly 101 is of a hollow structure, and the at least one battery cell 102 is accommodated in the case assembly 101.

The case assembly 101 may include a first case 101a and a second case 101b. The plurality of battery cells 102 are combined via connection in parallel or in series or in series-parallel and then placed in an enclosed cavity formed after the first case 101a and the second case 101b are snap-fitted together.

At least one of the first case 101a and the second case 101b includes an end plate 10.

Referring to FIG. 3 to FIG. 5, some embodiments of the present application provide an end plate 10, which includes a first plate 1 and a second plate 2.

The first plate 1 includes a first connecting part 11. The first connecting part 11 is arranged as a closed loop along a circumferential edge of the first plate 1, and the first connecting part 11 is configured to form a continuously sealed connection with an environmental component.

The second plate 2 is disposed in a stacked manner with the first plate 1 in the first direction X, the second plate 2 includes second connecting parts 21 spaced apart from each other along a circumferential edge of the second plate 2, and the second connecting parts 21 are configured to be connected to the environmental component via a connecting member 30.

In the above embodiment, the end plate 10 includes the first plate 1 and the second plate 2 disposed in a stacked manner. The first connecting part 11 of the first plate 1 forms a continuously sealed connection with the environmental component to achieve sealing at the joint between the end plate 10 and the environmental component. The second connecting parts 21 of the second plate 2 are connected to the environmental component via the connecting member 30 to improve the connection strength between the end plate 10 and the environmental component. The end plate 10 has a simple structure with fewer components, and the connection of the end plate to the environmental component is easy to operate, cost-effective, and highly reliable.

In some embodiments, the first plate 1 includes an aluminum plate.

In some embodiments, the second plate 2 includes a steel plate or an aluminum plate.

In some embodiments, the first connecting part 11 and the second connecting parts 21 are not in the same plane.

In the above embodiment, since the first connecting part 11 and the second connecting parts 21 are not in the same plane, when one of the first connecting part 11 and the second connecting parts 21 is connected, the other of the first connecting part 11 and the second connecting parts 21 is not affected.

Figure 6:
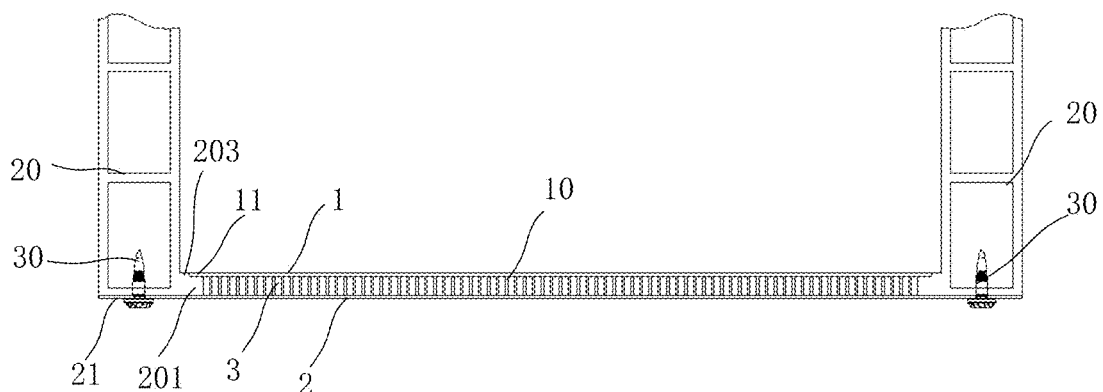
FIG. 6 is a cross-sectional view of a case disclosed according to the first embodiment of the present application.
Figure 7:
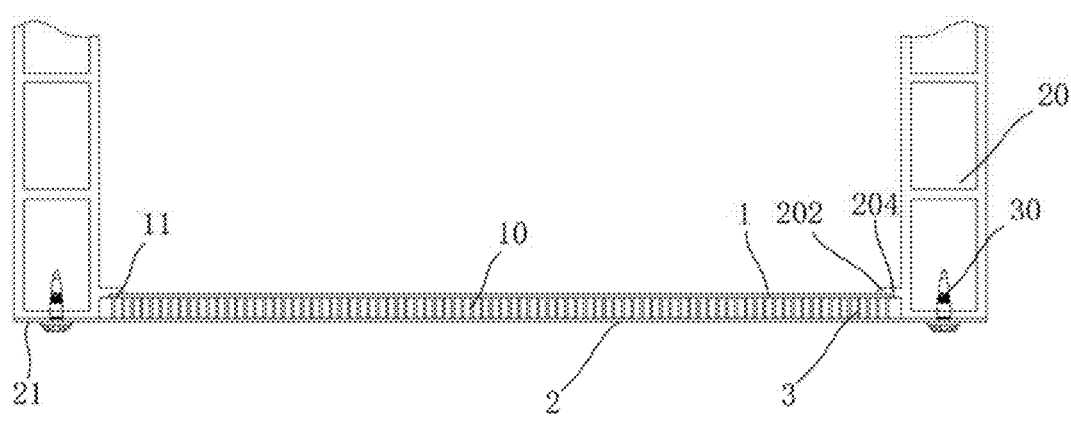
FIG. 7 is a cross-sectional view of a case disclosed according to a second embodiment of the present application.

Referring to FIG. 6 and FIG. 7, in some embodiments, the end plate 10 further includes an intermediate member 3 disposed between the first plate 1 and the second plate 2. The intermediate member 3 connects the first plate 1 and the second plate 2 and allows the first plate 1 to be separated from the second plate 2.

In the above embodiment, the intermediate member 3 is disposed between the first plate 1 and the second plate 2, and the intermediate member 3 allows the first plate 1 to be separated from the second plate 2, such that a buffering effect can be provided for the end plate 10 and the impact resistance of the end plate 10 can be improved.

In some embodiments, the intermediate member 3 is configured as a honeycomb structure.

In the above embodiment, the intermediate member 3 of a honeycomb structure is disposed between the first plate 1 and the second plate 2, such that a buffering effect can be provided for the end plate 10 and the impact resistance of the end plate 10 can be improved.

In some embodiments, the material of the intermediate member 3 includes plastic, such as polypropylene (PP), or the material of the intermediate member 3 includes aluminum.

In some embodiments, the intermediate member 3 is a honeycomb structure made of PP material. The first plate 1, the second plate 2, and the intermediate member 3 located between the first plate 1 and the second plate 2 are integrated by heat melting to form the end plate 10 of a three-layer structure.

In some embodiments, the intermediate member 3 is a honeycomb structure made of an aluminum material. The first plate 1, the second plate 2, and the intermediate member 3 located between the first plate 1 and the second plate 2 are integrated by aluminum alloy brazing to form the end plate 10 of a three-layer structure.

In some embodiments, the first plate 1 is an aluminum plate, the second plate 2 is a steel plate, and the intermediate member 3 is a PP honeycomb structure. The aluminum plate, the PP honeycomb structure, and the steel plate are pressed into one piece to form the end plate 10.

Figure 8:
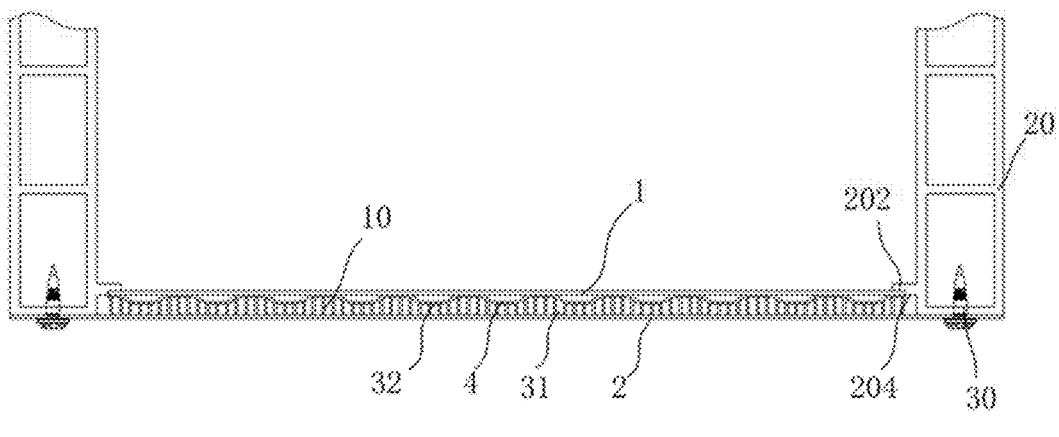
FIG. 8 is a cross-sectional view of a case disclosed according to a third embodiment of the present application.

Referring to FIG. 8, the end plate 10 further includes an intermediate member 3. The intermediate member 3 forms at least one flow channel 4 between the first plate 1 and the second plate 2. The extension direction of the flow channel 4 intersects with the first direction X, and the first direction X is parallel to the direction from the first plate 1 to the second plate 2.

In the above embodiment, the intermediate member 3 forms at least one flow channel 4 between the first plate 1 and the second plate 2, such that coolant liquid can be conveyed through the flow channel 4 to reduce the temperature of the end plate 10 and other components that abut against the end plate 10, and a buffering effect can be provided by the intermediate member 3 to improve the impact resistance of the end plate 10.

In some embodiments, the extension direction of the flow channel 4 is perpendicular to the first direction X.

The first direction X is parallel to the direction from the first plate 1 to the second plate 2. The first direction X is perpendicular to the second direction Y and the third direction Z, and the second direction Y is perpendicular to the third direction Z.

Referring to FIG. 8, the end plate 10 further includes an intermediate member 3 disposed between the first plate 1 and the second plate 2. The intermediate member 3 includes a first component 31 and a second component 32. The first component 31 is configured as a honeycomb structure. The second component 32 forms at least one flow channel 4 between the first component 31 and the first plate 1. Alternatively, the second component 32 forms at least one flow channel 4 between the first component 31 and the second plate 2. The extension direction of the flow channel 4 intersects with the first direction X, and the first direction X is parallel to the direction from the first plate 1 to the second plate 2.

In the above embodiment, the intermediate member 3 includes a first component 31 and a second component 32. The first component 31 is configured as a honeycomb structure, such that a buffering effect can be provided and the impact resistance of the end plate 10 can be improved. The second component 32 forms at least one flow channel 4 between the first plate 1 and the second plate 2, such that coolant liquid can be conveyed through the flow channel 4 to reduce the temperature of the end plate 10 and other components that abut against the end plate 10, and a buffering effect can be provided by the second component 32 to improve the impact resistance of the end plate 10.

Figure 9:
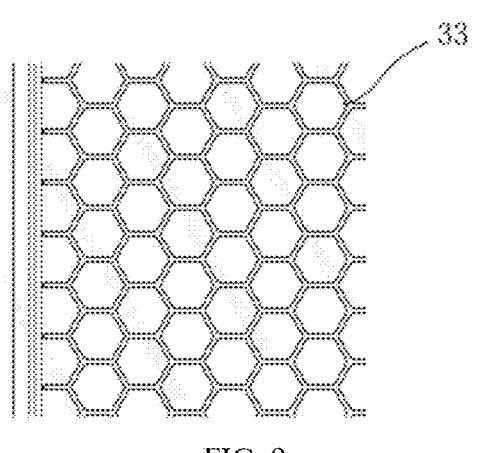
FIG. 9 is a schematic view of a first honeycomb structure disclosed according to some embodiments of the present application.

Referring to FIG. 9, in some embodiments, the honeycomb structure includes a first honeycomb structure 33, and the first honeycomb structure 33 is a hexagonal honeycomb structure.

Figure 10:
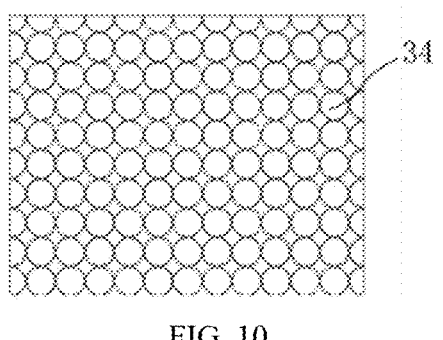
FIG. 10 is a schematic view of a second honeycomb structure disclosed according to some embodiments of the present application.

Referring to FIG. 10, in some embodiments, the honeycomb structure further includes a second honeycomb structure 34, and the second honeycomb structure 34 is a circular honeycomb structure.

Certainly, the honeycomb structure is not limited to the hexagonal honeycomb structure and the circular honeycomb structure.

Referring to FIG. 4, FIG. 5, FIG. 11, and FIG. 12, in some embodiments, the projection range of the second connecting parts 21 in the first direction X covers and extends beyond the projection range of the first connecting part 11 in the first direction X.

The projection of the second plate 2 in the first direction X covers and extends beyond the projection of the first plate 1 in the first direction X. The first direction X is parallel to the direction from the first plate 1 to the second plate 2.

In the above embodiment, the circumferential edge of the second plate 2 extends beyond the circumferential edge of the first plate 1 to achieve a continuously sealed connection between the first connecting part 11 at the circumferential edge of the first plate 1 and the environmental component and the connection of the second connecting parts 21 provided at the circumferential edge of the second plate 2 to the environmental component via the connecting member 30.

Referring to FIG. 4 and FIG. 5, in some embodiments, the projection range of the first connecting part 11 in the first direction X covers and extends beyond the projection range of the intermediate member 3 in the first direction X.

The projection of the first plate 1 in the first direction X covers and extends beyond the projection of the intermediate member 3 in the first direction X, and the first direction X is parallel to the direction from the first plate 1 to the second plate 2.

In the above embodiment, the circumferential edge of the first plate 1 extends beyond the circumferential edge of the intermediate member 3 to achieve the following: assembling the first plate 1, the intermediate member 3, and the second plate 2 first, then inserting the extending part of the environmental component into the area between the first plate 1 and the second plate 2, and achieving a continuously sealed connection between the first plate 1 and the environmental component at a side of the first plate 1 facing away from the second plate 2.

Figure 11:
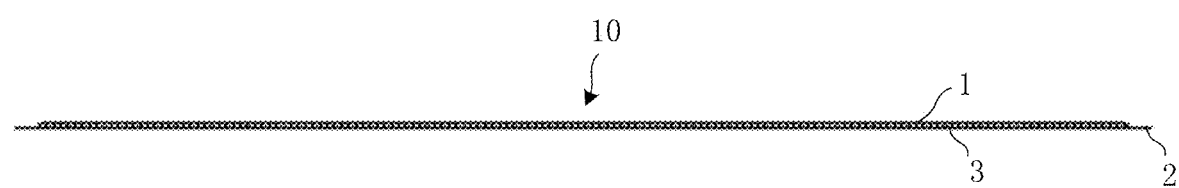
FIG. 11 is a cross-sectional view of an end plate disclosed according to the second embodiment of the present application.
Figure 12:
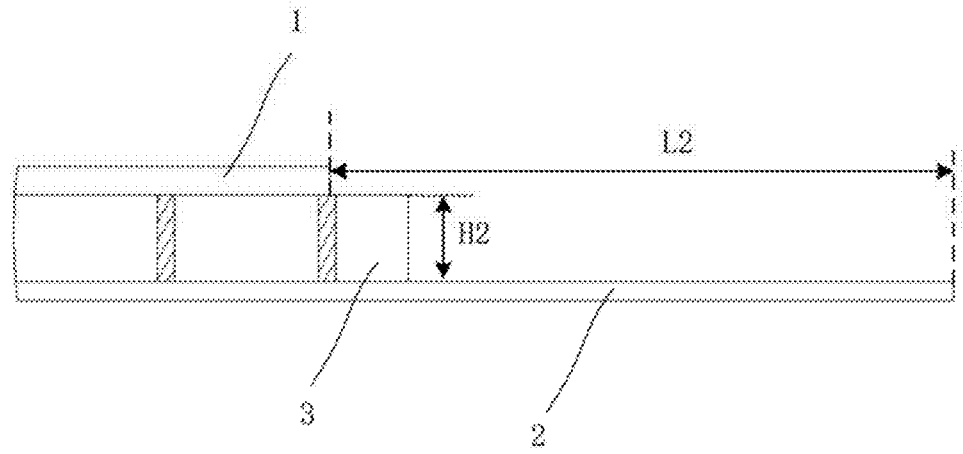
FIG. 12 is a partially enlarged schematic view of FIG. 11.

Referring to FIG. 11 and FIG. 12, in some embodiments, the projection range of the intermediate member 3 in the first direction X covers and extends beyond the projection range of the first connecting part 11 in the first direction X.

The projection of the intermediate member 3 in the first direction X covers and extends beyond the projection of the first plate 1 in the first direction X, and the first direction X is parallel to the direction from the first plate 1 to the second plate 2.

In the above embodiment, the circumferential edge of the intermediate member 3 extends beyond the circumferential edge of the first plate 1 to achieve a continuously sealed connection between the first plate 1 and the environmental component at a side of the first plate 1 close to the second plate 2 first and then the assembling of the intermediate member 3 and the second plate 2.

Referring to FIG. 6 to FIG. 8, some embodiments further provide a case, which includes the end plate 10 and the frame 20 according to any one of the above embodiments. The frame 20 is an environmental component.

In some embodiments, the frame 20 includes a circumferential side wall that encloses a cavity. For example, the frame 20 includes four side walls connected in sequence.

The end plate 10 includes a first plate 1 and a second plate 2 disposed in a stacked manner.

The first plate 1 includes a first connecting part 11. The first connecting part 11 is arranged as a closed loop along a circumferential edge of the first plate 1, and the first connecting part 11 forms a continuously sealed connection with the frame 20.

The second plate 2 includes second connecting parts 21 disposed along a circumferential edge of the second plate 2, and the second connecting parts 21 are connected to the frame 20 via a connecting member 30.

In the above embodiment, the end plate 10 includes the first plate 1 and the second plate 2 disposed in a stacked manner. The first connecting part 11 of the first plate 1 forms a continuously sealed connection with the frame 20 to achieve sealing at the joint between the end plate 10 and the frame 20. The second connecting parts 21 of the second plate 2 are connected to the frame 20 via the connecting member 30 to improve the connection strength between the end plate 10 and the frame 20. The end plate 10 has a simple structure with fewer components, and the connection of the end plate 10 to the frame 20 is easy to operate, cost-effective, and highly reliable.

In some embodiments, the first connecting part 11 is closer to the internal space of the case than the second connecting parts 21.

In the above embodiment, since the first connecting part 11 is closer to the internal space of the case than the second connecting parts 21, when one of the first connecting part 11 and the second connecting parts 21 is connected, the other of the first connecting part 11 and the second connecting parts 21 is not affected.

In some embodiments, the first connecting part 11 forms a continuously sealed connection with the frame 20 by friction stir welding (FSW).

In the above embodiment, the first connecting part 11 is connected to the frame 20 by friction stir welding, which offers operational convenience, facilitates mechanization and automation, and requires simple equipment at low cost.

In the above embodiment, the friction stir welding is solid phase welding. Certainly, the connection between the first connecting part 11 and the frame 20 is not limited to solid welding, and fusion welding, brazing, or the like, may also be adopted to form a continuously sealed connection.

In some embodiments, the case further includes a connecting member 30, and the connecting member 30 includes a flow drill screw (FDS).

In the above embodiment, the second connecting parts 21 are connected to the frame 20 via flow drill screws, and no pre-punching is required. This is easy to operate and requires low costs.

In some embodiments, the connecting member 30 includes a bolt, a screw, a connecting pin, or the like.

Referring to FIG. 6 to FIG. 8, in some embodiments, the projection range of the second connecting parts 21 in the first direction X covers and extends beyond the projection range of the first connecting part 11 in the first direction X. The frame 20 is disposed at a side of the second plate 2 adjacent to the first plate 1, and the frame 20 is disposed around a circumferential outer edge of the first plate 1.

In the above embodiment, the frame 20 is disposed at a side of the second plate 2 adjacent to the first plate 1, the second plate 2 covers the frame 20, the frame 20 is disposed around the circumferential outer edge of the first plate 1, and the projection range of the second connecting parts 21 in the first direction X covers and extends beyond the projection range of the first connecting part 11 in the first direction X. This is to achieve a continuously sealed connection between the first connecting part 11 at the circumferential edge of the first plate 1 and the frame 20, so that the frame 20 and the end plate 10 can form a sealed connection to allow the cavity enclosed by the frame 20 to be sealed at the end plate 10. At least two connecting members 30 spaced apart from each other at the circumferential edge of the second plate 2 are connected to the frame 20 to improve connection strength between the end plate 10 and the frame 20.

Referring to FIG. 6, in some embodiments, the projection range of the first connecting part 11 in the first direction X covers and extends beyond the projection range of the intermediate member 3 in the first direction X. The frame 20 includes a first extending part 201 extending into the area between the first plate 1 and the second plate 2, and the first extending part 201 forms a continuously sealed connection with the first connecting part 11.

In the above embodiment, the projection range of the first connecting part 11 in the first direction X covers and extends beyond the projection range of the intermediate member 3 in the first direction X to achieve the following: assembling the first plate 1, the intermediate member 3, and the second plate 2 to form the end plate 10 first, then inserting the first extending part 201 of the frame 20 into the area between the first plate 1 and the second plate 2, and then allowing the first connecting part 11 to form a continuously sealed connection with the first extending part 201 of the frame 20 in the cavity enclosed by the frame 20. The first extending part 201 is configured to connect the frame 20 to the end plate 10 and can also support the welding of the first plate 1.

In some embodiments, a side of the first extending part 201 facing away from the second plate 2 forms a continuously sealed connection with the first connecting part 11.

In the above embodiment, the first extending part 201 of the frame 20 is inserted into the area between the first plate 1 and the second plate 2, and the side of the first extending part 201 facing away from the second plate 2 abuts against the first connecting part 11 to form a continuously sealed connection, thereby achieving the continuously sealed connection between the first plate 1 and the frame 20.

In some embodiments, the frame 20 further includes a first limiting part 203. The first limiting part 203 is disposed at the side of the first extending part 201 facing away from the second plate 2, and the first limiting part 203 abuts against the circumferential outer edge of the first plate 1.

In the above embodiment, allowing the first limiting part 203 to abut against the circumferential outer edge of the first plate 1 can position the first plate 1 and is to achieve a continuously sealed connection between the first plate 1 and the first limiting part 203, as well as the first extending part 201.

In the above embodiment, the first limiting part 203 is disposed at the side of the first extending part 201 facing away from the second plate 2, and the first limiting part 203 and the first extending part 201 form a step-shaped structure. This can limit the first plate 1 and also enables the formation of a continuously sealed connection with the first plate 1.

In some embodiments, the side of the first limiting part 203 facing away from the second plate 2 is flush with the side of the first plate 1 facing away from the second plate 2.

In the above embodiment, allowing the side of the first limiting part 203 facing away from the second plate 2 to be flush with the side of the first plate 1 facing away from the second plate 2 can enable the formation of a flat bottom structure in the case.

In some embodiments, the projection of the first plate 1 in the first direction X covers and extends beyond the projection of the intermediate member 3 in the first direction X, and the first direction X is parallel to the direction from the first plate 1 to the second plate 2.

In the above embodiment, the circumferential edge of the first plate 1 extends beyond the circumferential edge of the intermediate member 3, so that the first extending part 201 extends into the area between the first plate 1 and the second plate 2.

In some embodiments, the first extending part 201 abuts against the circumferential outer edge of the intermediate member 3.

Referring to FIG. 7 and FIG. 8, in some other embodiments, the projection range of the intermediate member 3 in the first direction X covers and extends beyond the projection range of the first connecting part 11 in the first direction X; the frame 20 includes a second extending part 202, the second extending part 202 is located at a side of the first plate 1 facing away from the second plate 2, and the second extending part 202 forms a continuously sealed connection with the first connecting part 11.

In the above embodiment, the projection range of the intermediate member 3 in the first direction X covers and extends beyond the projection range of the first connecting part 11 in the first direction X to achieve the assembling of the intermediate member 3 and the second plate 2 after the formation of a continuously sealed connection between the first plate 1 and the frame 20 at a side of the first plate 1 close to the second plate 2.

In the above embodiment, the first plate 1 is first supported by the second extending part 202, the first connecting part 11 forms a continuously sealed connection with the second extending part 202 of the frame 20, and then the second plate 2 is assembled. The second extending part 202 is not only configured to connect the frame 20 and the end plate 10, but also configured to support the welding of the first plate 1.

In some embodiments, a side of the second extending part 202 adjacent to the second plate 2 forms a continuously sealed connection with the first connecting part 11.

In the above embodiment, the second extending part 202 is located at the side of the first plate 1 facing away from the second plate 2, and the side of the second extending part 202 adjacent to the second plate 2 abuts against the first connecting part 11 to form a continuously sealed connection with the first connecting part 11, thereby achieving a continuously sealed connection between the first plate 1 and the frame 20.

In some embodiments, the frame 20 further includes a second limiting part 204. The second limiting part 204 is disposed at the side of the second extending part 202 adjacent to the second plate 2, and the second limiting part 204 abuts against the circumferential outer edge of the first plate 1.

In the above embodiment, allowing the second limiting part 204 to abut against the circumferential outer edge of the first plate 1 can position the first plate 1 and is to achieve a continuously sealed connection between the first plate 1 and the second limiting part 204, as well as the second extending part 202.

In some embodiments, the side of the second limiting part 204 adjacent to the second plate 2 is flush with the side of the first plate 1 adjacent to the second plate 2.

In the above embodiment, the second limiting part 204 is configured to limit the first plate 1.

In some embodiments, the projection of the intermediate member 3 in the first direction X covers and extends beyond the projection of the first plate 1 in the first direction X, and the projection of the second plate 2 in the first direction X covers and extends beyond the projection of the intermediate member 3 in the first direction X. The first direction X is parallel to the direction from the first plate 1 to the second plate 2.

In the above embodiment, the circumferential edge of the intermediate member 3 extends beyond the circumferential edge of the first plate 1 and is configured to abut against the frame 20. The circumferential edge of the second plate 2 extends beyond the circumferential edge of the intermediate member 3 to achieve the covering of the frame 20 by the second plate 2 and achieve the connection to the frame 20.

Some embodiments of the present application further provide a battery 100, which includes the case in any one of the above embodiments.

The case may be at least one of a first case 101a and a second case 101b.

In some embodiments, the battery 100 further includes at least one battery cell 102. The at least one battery cell 102 includes a plurality of (two or more) battery cells 102. The plurality of battery cells 102 may be connected in series or in parallel or in series-parallel, where the series-parallel connection refers to the mixture of the serial connection and the parallel connection.

In some embodiments, the battery 100 includes a first case 101a and a second case 101b. The plurality of battery cells 102 are combined via connection in parallel or in series or in series-parallel and then placed in an enclosed cavity formed after the first case 101a and the second case 101b are snap-fitted together.

At least one of the first case 101a and the second case 101b is the case provided in any one of the above embodiments of the present application and correspondingly has the beneficial effects of the case.

Some embodiments of the present application further provide an electric device, which includes the battery cell 100 in any one of the above embodiments.

The electric device includes the battery 100 in any one of the above embodiments and correspondingly has the beneficial effects of the battery 100.

In some embodiments, the electric device includes a vehicle.

Some embodiments of the present application further provide an assembling method for a case, which includes the following steps:

providing a frame 20;

providing an end plate 10, where the end plate 10 includes a first plate 1 and a second plate 2 disposed in a stacked manner in a first direction X, the first plate 1 includes a first connecting part 11 arranged as a closed loop along a circumferential edge of the first plate 1, and the second plate 2 includes second connecting parts 21 spaced apart from each other along a circumferential edge of the second plate 2; and allowing an entire circumferential edge of at least one of the first connecting part 11 and the second connecting parts 21 to be in continuously sealed connection with the frame 20.

In the above embodiment, allowing the entire circumferential edge of at least one of the first connecting part 11 and the second connecting parts 21 to be in continuously sealed connection with the frame 20 is to achieve sealing at the joint between the end plate 10 and the frame 20. This mode features simple structure, convenient installation, high assembly efficiency, low costs, and high reliability.

In some embodiments, the first connecting part 11 is closer to the internal space of the case than the second connecting part 21.

Allowing the entire circumferential edge of at least one of the first connecting part 11 and the second connecting parts 21 to be in continuously sealed connection with the frame 20 includes: allowing the entire circumferential edge of the first connecting part 11 to be in continuously sealed connection with the frame 20, and allowing the circumferential edge of the second connecting parts 21 to be connected to the frame 20 via at least two connecting members 30.

In the above embodiment, the first connecting part 11 forms a continuously sealed connection with the frame 20 to achieve sealing at the joint between the end plate 10 and the frame 20. The second connecting parts 21 are connected to the frame 20 via at least two connecting members 30 to improve the connection strength between the end plate 10 and the frame 20. The end plate 10 has a simple structure with fewer components, and the connection of the end plate 10 to the frame 20 is easy to operate, cost-effective, and highly reliable.

In some embodiments, before allowing both a circumferential edge of the first connecting part 11 and the circumferential edge of the second connecting parts 21 to be connected to the frame 20, the assembling method further includes:

placing the frame 20 at a side of the second plate 2 adjacent to the first plate 1, where the frame 20 is disposed around a circumferential outer edge of the first plate 1, and a first extending part 201 on the frame 20 extends into the area between the first plate 1 and the second plate 2;

allowing the entire circumferential edge of at least one of the first connecting part 11 and the second connecting parts 21 to be in continuously sealed connection with the frame 20 includes:

allowing the entire circumferential edge of the first connecting part 11 to form a continuously sealed connection with the first extending part 201; and allowing the circumferential edge of the second connecting parts 21 to be connected to the frame 20 via at least two connecting members 30.

In the above embodiment, the end plate 10 is first manufactured and then is connected to the frame 20. The connection between the end plate 10 and the frame 20 is divided into an upper portion connection and a lower portion connection. For the upper portion of the end plate 10, a continuously sealed connection is adopted to connect the first plate 1 and the frame 20, and for the lower portion of the end plate 10, the second plate 2 is connected to the frame 20 via the connecting members 30. This mode in which the upper portion and the lower portion are both connected and fastened features simple structure, convenient installation, high assembly efficiency, low costs, and high reliability.

In some embodiments, providing the frame 20 includes: placing the frame 20, so that an end part of the frame 20 connected to the end plate 10 is located above a cavity enclosed by the frame 20;

Allowing the entire circumferential edge of at least one of the first connecting part 11 and the second connecting parts 21 to be in continuously sealed connection with the frame 20 includes: allowing the first plate 1 to be placed within the end part of the frame 20 and to be supported by a second extending part 202 on the frame 20; and allowing the entire circumferential edge of the first connecting part 11 to be in continuously sealed connection with the second extending part 202; and disposing the second plate 2 at a side of the first plate 1 facing away from the frame 20, allowing the second plate 2 to cover the frame 20, and allowing the second connecting parts 21 to be connected to the frame 20 via at least two connecting members 30.

In the above embodiment, the first plate 1 of the end plate 10 first forms a continuously sealed connection with the frame 20, then the second plate 2 is installed, and finally, the second plate 2 is connected to the frame 20 as a whole, thus forming a case structure with fewer components and parts and a simple structure. This mode in which the upper portion and the lower portion are both connected and fastened features simple structure, convenient installation, high assembly efficiency, low costs, and high reliability.

In the above embodiment, the end plate 10 includes the first plate 1 and the second plate 2 disposed in a stacked manner. The first connecting part 11 of the first plate 1 forms a continuously sealed connection with the frame 20 to achieve sealing at the joint between the end plate 10 and the frame 20. The second connecting parts 21 of the second plate 2 are connected to the frame 20 via at least two connecting members 30 to improve the connection strength between the end plate 10 and the frame 20. The end plate 10 has a simple structure with fewer components, and the connection of the end plate 10 to the frame 20 is easy to operate, cost-effective, and highly reliable.

The present application provides two assembling methods for a case, which are described below with reference to FIG. 13 to FIG. 23.

Figure 13:
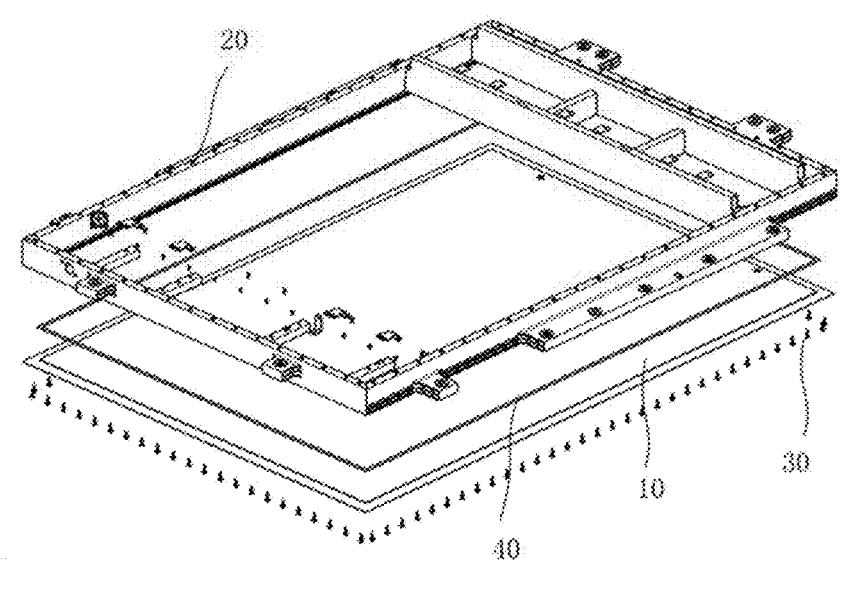
FIG. 13 is an exploded structural schematic view of the case disclosed according to the first embodiment of the present application.
Figure 14:
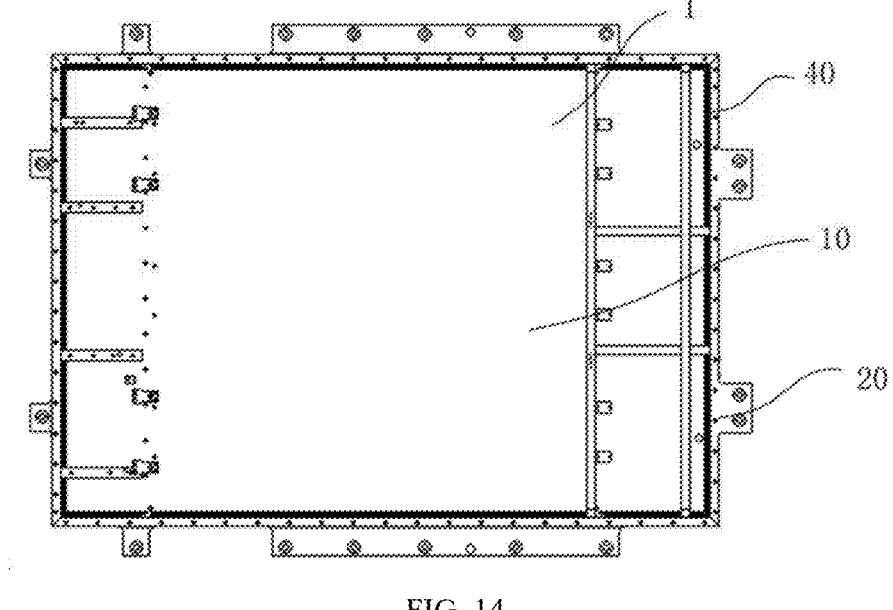
FIG. 14 is a top view of the case disclosed according to the first embodiment of the present application.
Figure 15:
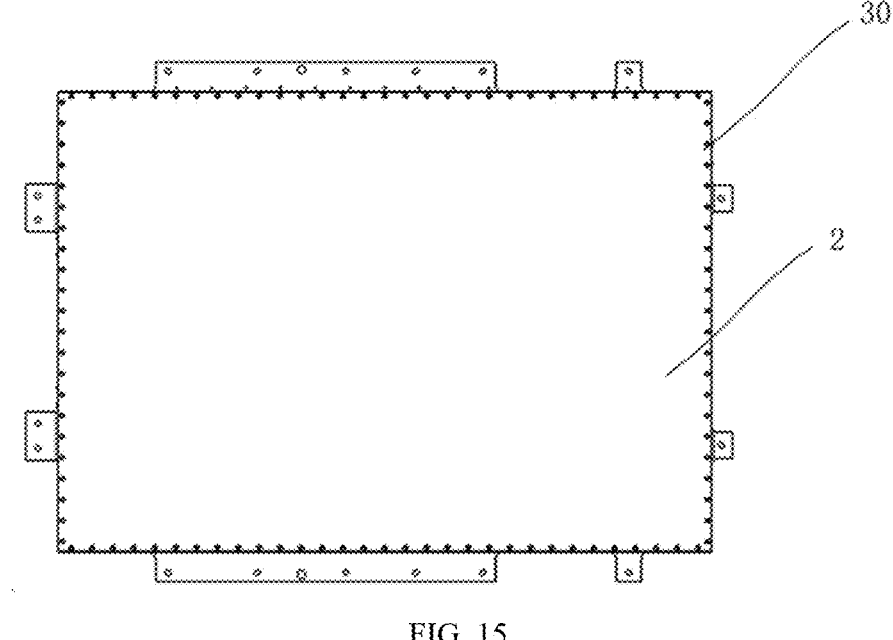
FIG. 15 is a bottom view of the case disclosed according to the first embodiment of the present application.

Referring to FIG. 13 to FIG. 16, some embodiments provide an assembling method for a case, which includes the following steps:

referring to FIG. 13, preparing an end plate 10 and a frame 20, where the end plate 10 includes a first plate 1 and a second plate 2 disposed in a stacked manner;

referring to FIG. 14, placing the frame 20 at a side of the second plate 2 adjacent to the first plate 1, disposing the frame 20 around a circumferential outer edge of the first plate 1, and allowing a first extending part 201 on the frame 20 to extend into an area between the first plate 1 and the second plate 2 (referring to FIG. 6); allowing the circumferential edge of the first plate 1 to form a continuously sealed connection with the first extending part 201; and referring to FIG. 15, allowing a circumferential edge of the second plate 2 to be connected to the frame 20 via at least two connecting members 30.

Figure 16:
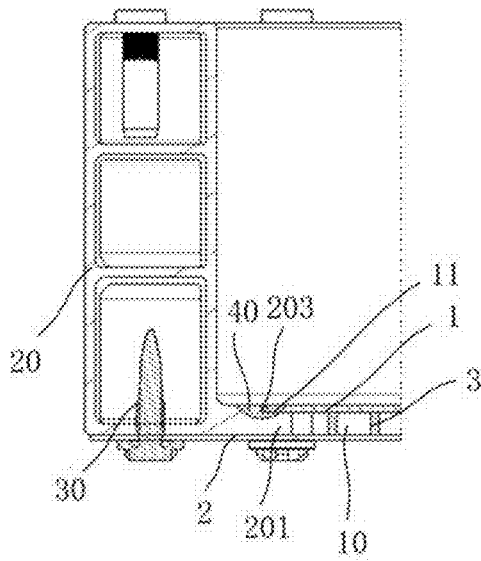
FIG. 16 is a partial cross-sectional view of the case disclosed according to the first embodiment of the present application.

FIG. 16 is a schematic view of the case after assembly. The circumferential edge of the first plate 1 forms a continuously sealed connection with the first extending part 201, and the circumferential edge of the second plate 2 is connected to the frame 20 via at least two connecting members 30.

In the above embodiment, the end plate 10 is first manufactured and then is connected to the frame 20. The connection between the end plate 10 and the frame 20 is divided into an upper portion connection and a lower portion connection. For the upper portion of the end plate 10, a continuously sealed connection is adopted to connect the first plate 1 and the frame 20, and for the lower portion of the end plate 10, the second plate 2 is connected to the frame 20 via the connecting members 30. This mode in which the upper portion and the lower portion are both connected and fastened features simple structure, convenient installation, high assembly efficiency, low costs, and high reliability.

Figure 18:
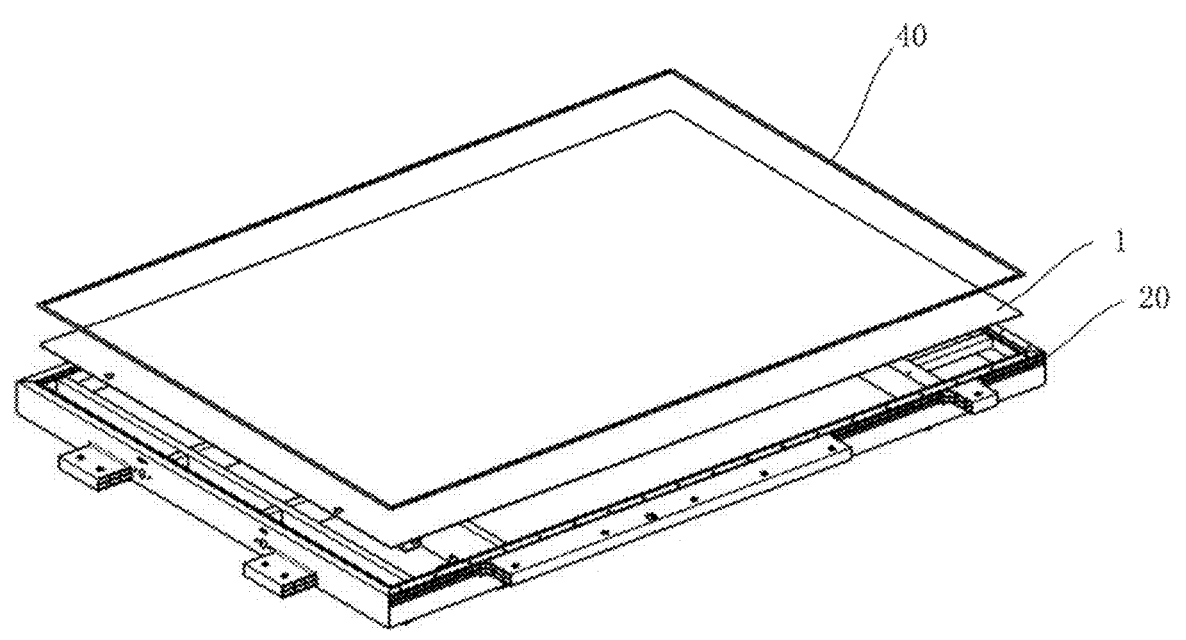
FIG. 18 is a schematic view in which a first plate is placed on a frame of the case disclosed according to the second embodiment of the present application.
Figure 19:
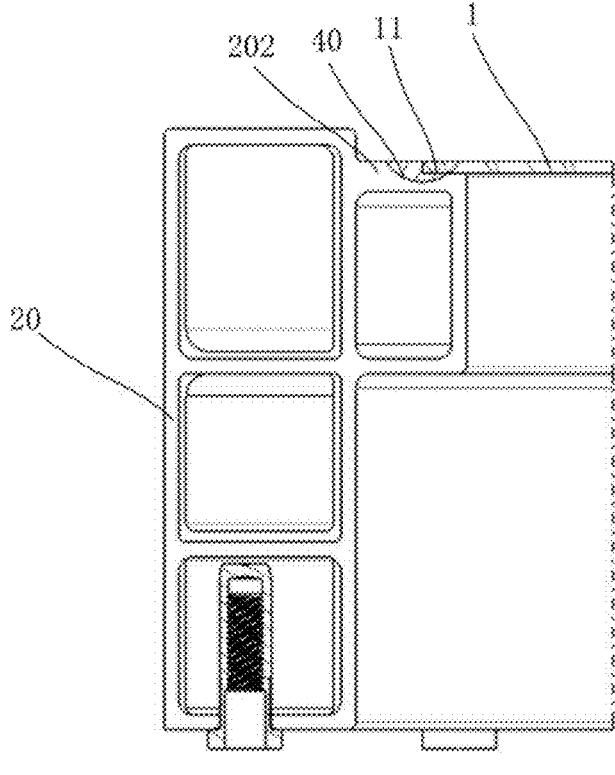
FIG. 19 is a partial cross-sectional view in which the frame of the case is connected to a first plate disclosed according to the second embodiment of the present application.
Figure 20:
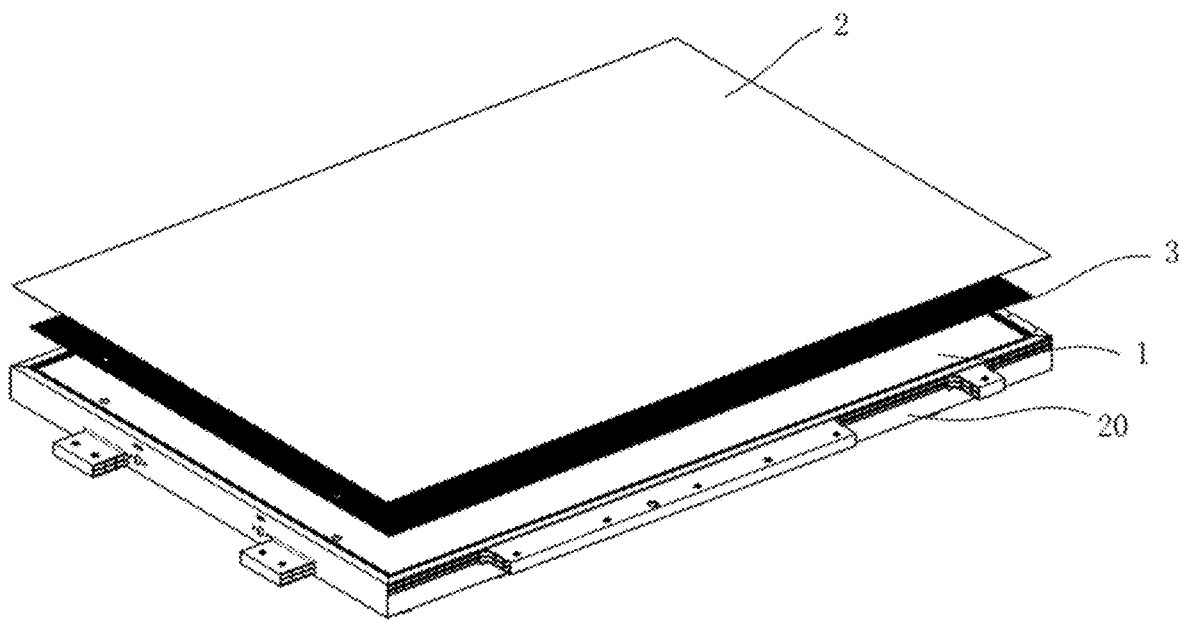
FIG. 20 is a schematic view in which an intermediate member and a second plate are placed after the frame of the case is connected to the first plate disclosed according to the second embodiment of the present application.
Figure 21:
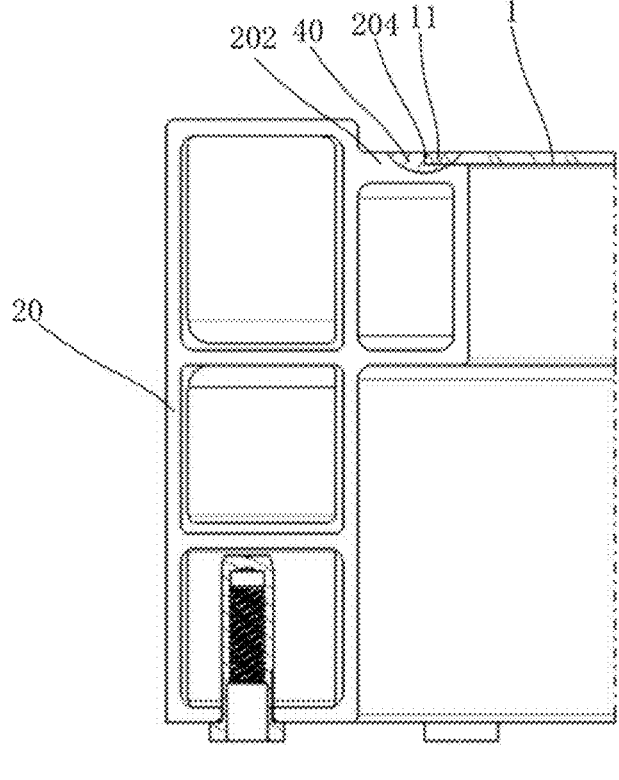
FIG. 21 is a schematic view in which the first plate is connected to the intermediate member and the second plate after the frame of the case is connected to the first plate disclosed according to the second embodiment of the present application.
Figure 22:
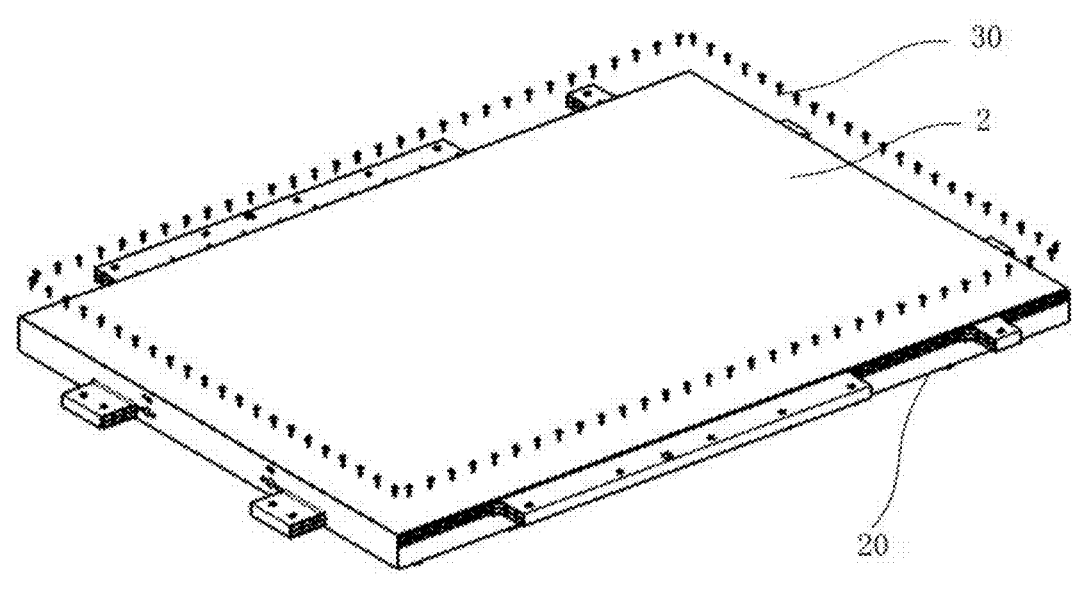
FIG. 22 is a schematic view in which the second plate of the case is connected to the frame disclosed according to the second embodiment of the present application.

Referring to FIG. 17 to FIG. 23, some other embodiments provide an assembling method for a case, which includes the following steps:

referring to FIG. 18, placing a frame 20, so that an end part of the frame 20 is located above a cavity enclosed by the frame 20;

referring to FIG. 19, allowing the first plate 1 to be placed within the end part of the frame 20 and to be supported by a second extending part 202 on the frame 20; and allowing a circumferential edge of the first plate 1 to form a continuously sealed connection with the second extending part 202;

referring to FIG. 20 and FIG. 21, disposing the second plate 2 at a side of the first plate 1 facing away from the frame 20, and allowing the second plate 2 to cover the frame 20; and referring to FIG. 22, allowing a circumferential edge of the second plate 2 to be connected to the frame 20 via at least two connecting members 30.

Figure 23:
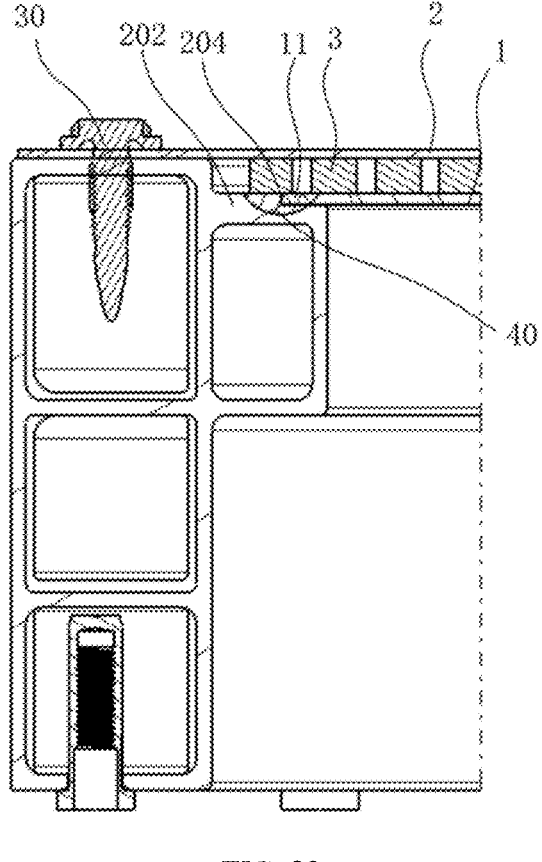
FIG. 23 is a partial cross-sectional view of the case disclosed according to the second embodiment of the present application.

FIG. 23 is a schematic view of the case after assembly. The circumferential edge of the first plate 1 forms a continuously sealed connection with the second extending part 202, and the circumferential edge of the second plate 2 is connected to the frame 20 via at least two connecting members 30.

In the above embodiment, the first plate 1 of the end plate 10 first forms a continuously sealed connection with the frame 20, then the second plate 2 is installed, and finally, the second plate 2 is connected to the frame 20 as a whole, thus forming a case structure with fewer components and parts and a simple structure. This mode in which the upper portion and the lower portion are both connected and fastened features simple structure, convenient installation, high assembly efficiency, low costs, and high reliability.

Figure 17:
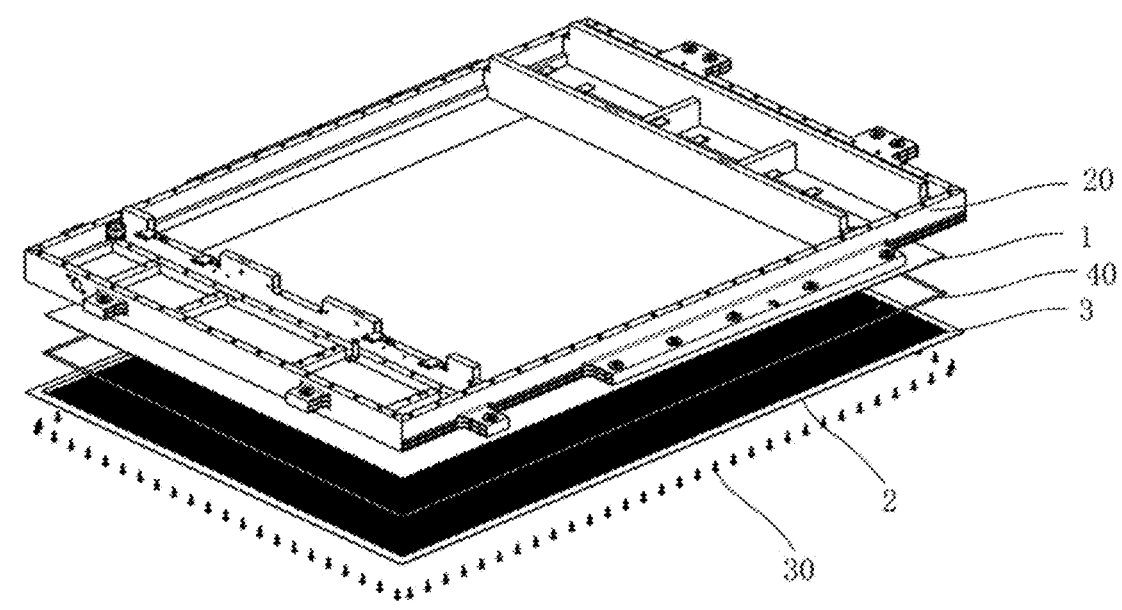
FIG. 17 is an exploded structural schematic view of the case disclosed according to the second embodiment of the present application.

It should be noted that the weld seam 40 shown in FIG. 13, FIG. 17, and FIG. 18 may be formed after the first plate 1 and the frame 20 are welded. The weld seam 40 is illustrated separately for clarity of illustration of the various components of the case.

Two embodiments of the end plate 10 and two assembling methods for a case are listed below.

First embodiment: Referring to FIG. 3 to FIG. 5, an end plate 10 includes a first plate 1, an intermediate member 3, and a second plate 2 disposed in a stacked manner.

The projection of the first plate 1 in the first direction X covers and extends beyond the projection of the intermediate member 3 in the first direction X. The projection of the second plate 2 in the first direction X covers and extends beyond the projection of the first plate 1 in the first direction X. The first direction X is parallel to the direction from the first plate 1 to the second plate 2.

The first plate 1 is an aluminum plate. The thickness of the first plate 1 ranges from 1.5 mm to 2.5 mm.

The second plate 2 is a steel plate or an aluminum plate. The second plate 2 is a steel plate, and the thickness of the second plate 2 ranges from 0.5 mm to 1.5 mm. The second plate 2 is an aluminum plate, and the thickness of the second plate 2 ranges from 1 mm to 2 mm.

The intermediate member 3 is a honeycomb plate. The material of the intermediate member 3 may be plastic or aluminum (for example, the plastic may be polypropylene (PP)) to form a honeycomb plastic or a honeycomb aluminum plate. When the intermediate member 3 is a honeycomb aluminum plate, the first plate 1, the second plate 2, and the intermediate member 3 are integrated by aluminum alloy brazing to form an end plate 10 of a three-layer structure with good rigidity and high strength. When the intermediate member 3 is a honeycomb plastic, PP adhesive films are respectively attached to the upper surface and the lower surface of the honeycomb plate, and the first plate 1, the second plate 2, and the intermediate member 3 are integrated by hot pressing and heat melting to form an end plate 10 of a three-layer structure with good rigidity and high strength. The thickness H1 of the intermediate member 3 ranges from 5 mm to 10 mm. Referring to FIG. 9, the honeycomb structure includes a first honeycomb structure 33. The first honeycomb structure 33 is a hexagonal honeycomb structure. Referring to FIG. 10, the honeycomb structure further includes a second honeycomb structure 34. The second honeycomb structure 34 is a circular honeycomb structure.

Referring to FIG. 5, the projection of the second plate 2 in the first direction X covers and extends beyond the projection of the first plate 1 in the first direction X, and the value of the dimension L1 by which the second plate 2 extends beyond the first plate 1 ranged from 10 mm to 50 mm.

A first assembling method for a case, that is, an assembling method for the end plate 10 and the frame 20 in the first embodiment, includes:

referring to FIG. 13, preparing an end plate 10 and a frame 20, where the end plate 10 includes a first plate 1, an intermediate member 3, and a second plate 2 disposed in a stacked manner;

referring to FIG. 6 and FIG. 14, placing the frame 20 at a side of the second plate 2 adjacent to the first plate 1, disposing the frame 20 around a circumferential outer edge of the first plate 1, and allowing a first extending part 201 on the frame 20 to extend into an area between the first plate 1 and the second plate 2 and abut against the intermediate member 3; allowing the circumferential edge of the first plate 1 to form a continuously sealed connection with the first extending part 201 by friction stir welding (FSW); and Referring to FIG. 15, allowing a circumferential edge of the second plate 2 to be connected to the frame 20 via at least two flow drill screws (FDS).

FIG. 16 is a schematic view of the case after assembly. The circumferential edge of the first plate 1 forms a continuously sealed connection with the first extending part 201 by friction stir welding (FSW), and the circumferential edge of the second plate 2 is connected to the frame 20 via at least two flow drill screws (FDS).

In the first embodiment, the end plate 10 is first manufactured and then is connected to the frame 20. The end plate 10 may serve as the bottom plate of the case. The connection between the end plate 10 and the frame 20 is divided into an upper portion connection and a lower portion connection. For the upper portion of the end plate 10, the first plate is connected to the frame by FSW, and for the lower portion of the end plate 10, the second plate is connected to the frame via FDS.

The connection using FSW and FDS allows the end plate 10 and the frame 20 to be connected as a whole to form a case structure with fewer components and parts and a simple structure. In addition, this mode in which the upper portion and the lower portion are both connected and fastened features simple structure, convenient installation, high assembly efficiency, low costs, and high reliability, and can be widely promoted and used and exhibits relatively high market value.

The FSW weld seam in the first embodiment is located at the bottom of the inner cavity of the case, that is, the end plate 10 and the frame 20 are welded inside the cavity enclosed by the frame 20. Because the weld seam is close to a circumferential side wall of the frame 20, when the cavity enclosed by the frame 20 is relatively deep, the space is limited, and friction stir welding cannot be performed or dedicated friction stir welding head equipment needs to be customized. In this case, an end plate 10 provided in the following second embodiment and a second assembling method for a case may be used.

Second embodiment: Referring to FIG. 3, FIG. 11, and FIG. 12, an end plate 10 includes a first plate 1, an intermediate member 3, and a second plate 2 disposed in a stacked manner.

The projection of the intermediate member 3 in the first direction X covers and extends beyond the projection of the first plate 1 in the first direction X. The projection of the second plate 2 in the first direction X covers and extends beyond the projection of the intermediate member 3 in the first direction X. The first direction X is parallel to the direction from the first plate 1 to the second plate 2.

The first plate 1 is an aluminum plate. The thickness of the first plate 1 ranges from 1.5 mm to 2.5 mm.

The second plate 2 is a steel plate or an aluminum plate. The second plate 2 is a steel plate, and the thickness of the second plate 2 ranges from 0.5 mm to 1.5 mm. The second plate 2 is an aluminum plate, and the thickness of the second plate 2 ranges from 1 mm to 2 mm.

The intermediate member 3 is a honeycomb plate. The material of the intermediate member 3 may be plastic or aluminum (for example, the plastic may be polypropylene (PP)) to form a honeycomb plastic or a honeycomb aluminum plate. When the intermediate member 3 is a honeycomb aluminum plate, the first plate 1, the second plate 2, and the intermediate member 3 are integrated by aluminum alloy brazing to form an end plate 10 of a three-layer structure with good rigidity and high strength. When the intermediate member 3 is a honeycomb plastic, PP adhesive films are respectively attached to the upper surface and the lower surface of the honeycomb plate, and the first plate 1, the second plate 2, and the intermediate member 3 are integrated by hot pressing and heat melting to form an end plate 10 of a three-layer structure with good rigidity and high strength. The thickness H2 of the intermediate member 3 ranges from 5 mm to 10 mm. Referring to FIG. 9, the honeycomb structure includes a first honeycomb structure 33. The first honeycomb structure 33 is a hexagonal honeycomb structure. Referring to FIG. 10, the honeycomb structure further includes a second honeycomb structure 34. The second honeycomb structure 34 is a circular honeycomb structure.

Referring to FIG. 12, the projection of the second plate 2 in the first direction X covers and extends beyond the projection of the first plate 1 in the first direction X, and the value of the dimension L2 by which the second plate 2 extends beyond the first plate 1 ranged from 25 mm to 60 mm.

A second assembling method for a case, that is, an assembling method for the end plate 10 and the frame 20 in the second embodiment, includes:

referring to FIG. 18, placing a frame 20, so that an end part of the frame 20 is located above a cavity enclosed by the frame 20;

Referring to FIG. 19, allowing a first plate 1 and the frame 20 to form, by FSW, a case semi-assembly that includes only the first plate 1 of the end plate 10, where specifically, the first plate 1 is disposed within the end part of the frame 20 and is supported by a second extending part 202 on the frame 20, and a circumferential edge of the first plate 1 forms a continuously sealed connection with the second extending part 202 by friction stir welding (FSW);

referring to FIG. 20 and FIG. 21, performing hot-pressing molding on the first plate 1 of the case semi-assembly, an intermediate member 3, and a second plate 2, where specifically, the intermediate member 3 is placed at a side of the first plate 1 facing away from the frame 20, the second plate 2 is placed at a side of the intermediate member 3 facing away from the first plate 1, the second plate 2 covers the frame 20, and hot-pressing molding is performed on the first plate 1, the intermediate member 3, and the second plate 2;

referring to FIG. 22, rigidly connecting the second plate 2 to the frame 20 by FDS, where specifically, a circumferential edge of the second plate 2 is connected to the frame 20 via at least two flow drill screws FDS.

FIG. 23 is a schematic view of the case after assembly. The circumferential edge of the first plate 1 forms a continuously sealed connection with the second extending part 202 by friction stir welding (FSW), and the circumferential edge of the second plate 2 is connected to the frame 20 via at least two flow drill screws (FDS).

In the second embodiment, the first plate 1 of the end plate 10 is first connected to the frame 20 by FSW, then the intermediate member 3 is inserted, and finally the second plate 2 is assembled. The first plate 1, the intermediate member 3, and the second plate 2 are integrated by hot pressing and heat melting to form an end plate 10 of a three-layer structure with good rigidity and high strength. Then, an FDS connection manner is used to connect the second plate 2 and the frame 20 as a whole to form a case structure with fewer components and parts and a simple structure. In conclusion, this case structure has fewer components and parts and takes a mode in which the upper portion and the lower portion are both connected and fastened, and thus features simple structure, convenient installation, high assembly efficiency, low costs, and high reliability. It can be widely promoted and used and exhibits relatively high market value.

FIG. 6 shows a first embodiment of a case. The case includes the end plate 10 provided in the first embodiment and is formed by using the first assembling method of a case.

FIG. 7 shows a second embodiment of a case. The case includes the end plate 10 provided in the second embodiment and is formed by using the second assembling method of a case.

FIG. 8 shows a third embodiment of a case. The end plate 10 included in the case and the end plate 10 provided in the second embodiment have different intermediate members 3, and other structures are the same. The case is formed by using the second assembling method of a case.

Although the present application has been described with reference to some embodiments, various modifications can be made and components can be replaced with equivalents without departing from the scope of the present application. In particular, the technical features mentioned in the embodiments can be combined in any manner, provided that there is no structural conflict. The present application is not limited to the specific embodiments disclosed herein but includes all the technical solutions that fall within the scope of the claims.

What is claimed is:

1. An end plate, comprising:
a first plate comprising a first connecting part, the first connecting part being arranged as a closed loop along a circumferential edge of the first plate and configured to form a continuously sealed connection with a frame;
a second plate disposed in a stacked manner with the first plate in a first direction, wherein the second plate comprises second connecting parts spaced apart from each other along a circumferential edge of the second plate, and the second connecting parts are configured to be connected to the frame via a connecting member; and
an intermediate member disposed between the first plate and the second plate, and comprising a first component and a second component, the first component being configured as a honeycomb structure, the second component forming at least one flow channel between the first component and the first plate, an extension direction of the flow channel intersecting with the first direction, and the flow channel being formed by a surface of the second component facing the first plate and a surface of the first plate facing the first component.

2. The end plate according to claim 1, wherein the first connecting part and the second connecting parts are not in the same plane.

3. The end plate according to claim 1, wherein the intermediate member connects the first plate and the second plate and allows the first plate to be separated from the second plate.

4. The end plate according to claim 1, wherein a projection area of the first connecting part in the first direction covers and extends beyond a projection area of the intermediate member in the first direction.

5. The end plate according to claim 1, wherein the projection area of the intermediate member in the first direction covers and extends beyond the projection area of the first connecting part in the first direction.

6. The end plate according to claim 1, wherein a projection area of the second connecting parts in the first direction covers and extends beyond a projection area of the first connecting part in the first direction.

7. A case, comprising:
the end plate according to claim 1; and
the frame.

8. The case according to claim 7, wherein the first connecting part is closer to an internal space of the case than the second connecting part.

9. The case according to claim 7, wherein a projection area of the second connecting parts in the first direction covers and extends beyond a projection area of the first connecting part in the first direction; the frame is disposed at a side of the second plate adjacent to the first plate, and the frame is disposed around a circumferential outer edge of the first plate.

10. The case according to claim 9, wherein:
the projection area of the first connecting part in the first direction covers and extends beyond a projection area of the intermediate member in the first direction; and
the frame comprises a first extending part extending into an area between the first plate and the second plate, and the first extending part forms a continuously sealed connection with the first connecting part.

11. The case according to claim 10, wherein a side of the first extending part facing away from the second plate forms a continuously sealed connection with the first connecting part.

12. The case according to claim 10, wherein the frame further comprises a first limiting part, the first limiting part is disposed at the side of the first extending part facing away from the second plate, and the first limiting part abuts against the circumferential outer edge of the first plate.

13. The case according to claim 12, wherein a side of the first limiting part facing away from the second plate is flush with a side of the first plate facing away from the second plate.

14. The case according to claim 9, wherein a projection area of the intermediate member in the first direction covers and extends beyond a projection area of the first connecting part in the first direction; the frame comprises a second extending part, the second extending part is located at a side of the first plate facing away from the second plate, and the second extending part forms a continuously sealed connection with the first connecting part.

15. The case according to claim 14, wherein the frame further comprises a second limiting part, the second limiting part is disposed at the side of the second extending part adjacent to the second plate, and the second limiting part abuts against the circumferential outer edge of the first plate.

16. A battery, comprising the case according to claim 1.

17. An assembling method for a case, comprising:
providing a frame;
providing an end plate, wherein the end plate comprises a first plate and a second plate disposed in a stacked manner in a first direction, the first plate comprises a first connecting part arranged as a closed loop along a circumferential edge of the first plate, and the second plate comprises second connecting parts spaced apart from each other along a circumferential edge of the second plate; and
allowing an entire circumferential edge of at least one of the first connecting part and the second connecting parts to be in continuously sealed connection with the frame;
wherein an intermediate member is disposed between the first plate and the second plate, and comprising a first component and a second component, the first component being configured as a honeycomb structure, the second component forming at least one flow channel between the first component and the first plate, an extension direction of the flow channel intersecting with the first direction, and the flow channel being formed by a surface of the second component facing the first plate and a surface of the first plate facing the first component.

18. The end plate according to claim 1, wherein a thickness of the second component in the first direction is less than a thickness of the first component in the first direction.

19. An end plate, comprising:
a first plate comprising a first connecting part, the first connecting part being arranged as a closed loop along a circumferential edge of the first plate and configured to form a continuously sealed connection with a frame;
a second plate disposed in a stacked manner with the first plate in a first direction, wherein the second plate comprises second connecting parts spaced apart from each other along a circumferential edge of the second plate, and the second connecting parts are configured to be connected to the frame via a connecting member; and
an intermediate member disposed between the first plate and the second plate, and comprising a first component and a second component, the first component being configured as a honeycomb structure, the second component forming at least one flow channel between the first component and the first plate or the second plate, an extension direction of the flow channel intersecting with the first direction, and a thickness of the second component in the first direction being less than a thickness of the first component in the first direction.

* * * * *